US011549882B2

(12) United States Patent
Burak et al.

(10) Patent No.: US 11,549,882 B2
(45) Date of Patent: Jan. 10, 2023

(54) REFERENCE ELECTRODE AND ELECTROCHEMICAL MONITORING SYSTEM

(71) Applicants: The Regents of the University of Michigan, Ann Arbor, MI (US); Michael Forrest Simpson, Ann Arbor, MI (US)

(72) Inventors: Adam Burak, Ann Arbor, MI (US); Michael Forrest Simpson, Murray, UT (US)

(73) Assignee: The Regents of the University of Michigan, Ann Arbor, MI (US)

( * ) Notice: Subject to any disclaimer, the term of this patent is extended or adjusted under 35 U.S.C. 154(b) by 21 days.

(21) Appl. No.: 17/181,294

(22) Filed: Feb. 22, 2021

(65) Prior Publication Data
US 2021/0318229 A1 Oct. 14, 2021

Related U.S. Application Data

(60) Provisional application No. 62/979,843, filed on Feb. 21, 2020.

(51) Int. Cl.
*G01N 17/02* (2006.01)
*G01N 17/00* (2006.01)

(52) U.S. Cl.
CPC ........... *G01N 17/02* (2013.01); *G01N 17/006* (2013.01)

(58) Field of Classification Search
CPC ...... G01N 17/02; G01N 17/04; G01N 17/043; G01N 17/006; G01N 27/301;
(Continued)

(56) References Cited

U.S. PATENT DOCUMENTS 3,816,269 A * 6/1974 Wilder ................. G01N 33/205
204/422
3,953,232 A * 4/1976 Roth ..................... H01M 10/36
429/231.95
(Continued)

FOREIGN PATENT DOCUMENTS

AU 2007231352 A1 * 9/2008 ........... H01G 9/2077
CN 105319253 A * 2/2016 ......... G01N 27/4114
(Continued)

OTHER PUBLICATIONS

Afonichkin, Valery K. et al.; Dynamic reference electrode for investigation of fluoride melts containing beryllium difluoride; Journal of Fluorine Chemistry; vol. 130, No. 1; 2009; 83-88.
(Continued)

*Primary Examiner* — Jermele M Hollington
*Assistant Examiner* — Sean Curtis
(74) *Attorney, Agent, or Firm* — Lempia Summerfield Katz LLC

(57) ABSTRACT

A reference electrode includes a metal body, a lead disposed within the metal body, an insulator disposed between the lead and the metal body, the insulator including a ceramic material, and a porous metal chamber coupled to the metal body, the lead extending into the porous metal chamber. The porous metal chamber is configured to maintain an electrolyte solution within the porous metal chamber to establish a redox couple with the lead.

21 Claims, 6 Drawing Sheets

(58) Field of Classification Search
CPC ............. G01N 27/333; G01N 27/3335; G01N 27/404; G01N 27/302; G01N 27/30; G01N 27/4035; G01N 33/2805; G01N 2203/024
USPC ...................................... 324/425, 700; 73/86
See application file for complete search history.

(56) References Cited

U.S. PATENT DOCUMENTS

| | | | | |
|---|---|---|---|---|
| 5,203,984 | A * | 4/1993 | Sakai ..................... | G01N 27/30 706/20 |
| 5,571,394 | A * | 11/1996 | Hettiarachchi .... | G01N 27/4035 376/256 |
| 5,976,345 | A * | 11/1999 | Pal ........................... | C25C 7/06 204/243.1 |
| 6,299,742 | B1 * | 10/2001 | Pal ........................... | C25C 3/00 204/243.1 |
| 7,632,384 | B1 * | 12/2009 | Redey .................. | G01N 27/416 204/422 |
| 8,152,978 | B2 * | 4/2012 | Hills .................. | G01N 27/4117 204/422 |
| 8,173,007 | B2 * | 5/2012 | Xu ........................ | G01N 17/02 204/422 |
| 9,134,266 | B2 * | 9/2015 | Thrier ....................... | F15D 1/00 |
| 2009/0127133 | A1 * | 5/2009 | Hills .................. | G01N 27/4114 204/422 |
| 2011/0108439 | A1 * | 5/2011 | Gourishankar .... | G01N 27/4166 205/789 |
| 2012/0279860 | A1 * | 11/2012 | Hills .................. | G01N 27/4114 204/427 |
| 2014/0034515 | A1 * | 2/2014 | Thrier ................ | G01N 27/4117 204/415 |
| 2021/0055248 | A1 * | 2/2021 | Tripathy ............ | G01N 27/4117 |
| 2021/0055253 | A1 * | 2/2021 | Wilhelm .............. | G01N 27/333 |
| 2021/0140910 | A1 * | 5/2021 | Chen ..................... | G01N 27/301 |
| 2021/0190674 | A1 * | 6/2021 | Liu ........................ | G01N 17/04 |
| 2021/0318229 | A1 * | 10/2021 | Burak .................... | G01N 27/302 |
| 2021/0356422 | A1 * | 11/2021 | Huo ........................ | G01N 27/36 |
| 2022/0091064 | A1 * | 3/2022 | Gervasio ................ | C25D 11/34 |

FOREIGN PATENT DOCUMENTS

| | | | | |
|---|---|---|---|---|
| CN | 105928866 | A | * | 9/2016 ............. G01N 17/02 |
| CN | 107037107 | A | * | 8/2017 ........... G01N 27/302 |
| CN | 105319253 | B | * | 8/2019 ......... G01N 27/4114 |
| CN | 107037107 | B | * | 10/2020 ........... G01N 27/302 |
| CN | 112415072 | A | * | 2/2021 ........... G01N 27/302 |
| CN | 113945106 | A | * | 1/2022 |
| DE | 19749111 | A1 | * | 6/1999 ............. G01N 17/02 |
| DE | 19749111 | A1 | * | 6/1999 ............. G01N 17/02 |
| DE | 19749111 | C2 | * | 10/2001 ............. G01N 17/02 |
| DE | 10112384 | A1 | * | 9/2002 ............. B82Y 35/00 |
| DE | 102015121364 | A1 | * | 6/2017 ........... G01N 27/302 |
| DE | 102019132726 | A1 | * | 6/2021 |
| DE | 102018109487 | B4 | * | 1/2022 |
| EP | 0417571 | A1 | * | 3/1991 |
| JP | 2842156 | B2 | * | 12/1998 |
| KR | 20160129299 | A | * | 11/2016 |
| WO | WO-2009095233 | A1 | * | 8/2009 ........... H01G 9/2081 |
| WO | WO-2012007660 | A1 | * | 1/2012 ........... G01N 27/301 |
| WO | WO-2020023912 | A1 | * | 1/2020 ........... H01M 12/065 |
| WO | WO-2021096933 | A1 | * | 5/2021 ........... G01N 27/301 |
| WO | WO-2022014234 | A1 | * | 1/2022 |

OTHER PUBLICATIONS

Bard, Allen J., and Larry R. Faulkner; Fundamentals and applications; Electrochemical methods; John Wiley & Sons, Inc.; 2001; 70 pp.

Burak, Adam J., and Michael Forrest Simpson; Electrochemical Measurement of Li2O in Molten LiCl Salt; ECS Transactions; vol. 75, No. 15; 2016; 55-61.

Burak, Adam J.; Study of Lithium Oxide Entrainment in Reduced Uranium Particles Formed from Electrolytic Reduction of UO2 in Molten Lithium Chloride-Lithium Oxide Salt; PhD dissertation, The University of Utah, 2019; 186 pp.

Carotti, Francesco, Huali Wu, and Raluca O. Scarlat; Characterization of a thermodynamic reference electrode for molten LiF—BeF2 (FLiBe); Journal of the Electrochemical Society; vol. 164, No. 12; 2017; H854-H861.

Coble, Jamie B., Steven E. Skutnik, S. Nathan Gilliam, and Michael P. Cooper; Review of Candidate Techniques for Material Accountancy Measurements in Electrochemical Separations Facilities; Nuclear Technology, vol. 206, No. 12 2020; 1803-1826.

D. E. Holcomb, R. A. Kisner, and S. M. Cetiner; Instrumentation Framework for Molten Salt Reactors; No. ORNL/TM-2018/868, Oak Ridge National Lab, 2018; 57 pp.

Doniger, William H., and Kumar Sridharan; Application of voltammetry for quantitative analysis of chromium in molten 2LiF—BeF2 (FLiBe) salt; Journal of Electroanalytical Chemistry; vol. 838; 2019; pp. 73-81.

Gibilaro, Mathieu, Laurent Massot, Pierre Chamelot, and Pierre Taxil; Co-reduction of aluminium and lanthanide ions in molten fluorides: Application to cerium and samarium extraction from nuclear wastes; Electrochimica Acta; vol. 54, No. 22; 2009; 5300-5306.

Jeong, S. M., S-B. Park, S-S. Hong, C-S. Seo, and S-W. Park; Electrolytic production of metallic uranium from U3O8 in a 20-kg batch scale reactor; Journal of Radioanalytical and Nuclear Chemistry; vol. 268, No. 2; 2006; 349-356.

K. Korsah et al.; Assessment of sensor technologies for Advanced Reactors; ORNL/TM-2016/337 R1; Oak Ridge National Lab, 2016; 168 pp.

Kelleher, Brian, Kieran Dolan, Mark Anderson, and Kumar Sridharan; Observed redox potential range of Li2BeF4 using a dynamic reference electrode; Nuclear Technology; vol. 195, No. 3; 2016; 239-252.

Orfield, M. L.; An investigation into membrane potentials generated across mullite in mixtures of molten alkali metal bromides; Journal of the Electrochemical Society; vol. 138, No. 8; 1991; 2348-2352.

Robb, Kevin R., Padhraic L. Mulligan, Graydon L. Yoder Jr, Kurt Smith, and Jordan Massengale; Facility to Alleviate Salt Technology Risks (FASTR): Preliminary Design Report with Failure Modes and Effects Analysis; No. ORNL/FM-2019/1370; Oak Ridge National Lab.(ORNL); 2019; 63 pp.

Shaltry, Michael R., Robert O. Hoover, and Guy L. Fredrickson; Kinetic Parameters and Diffusivity of Uranium in FLiNaK and ClLiK; Journal of the Electrochemical Society; vol. 167, No. 11; 2020; 8 pp.

Shirai, Osamu, Takayuki Nagai, Akihiro Uehara, and Hajimu Yamana; Electrochemical properties of the Ag+|Ag and other reference electrodes in the LiCl—KCl eutectic melts; Journal of Alloys and Compounds; vol. 456, No. 1-2; 2008; 498-502.

Sun, Chenteng, Qian Xu, Xingli Zou, Hongwei Cheng, and Xionggang Lu; A new method to determine AgCl (1% mol)/Ag electrode potential versus the standard chloride electrode potential in a LiCl—KCl eutectic; Electrochemistry Communications; vol. 130; 2021; 5 pp.

Tylka, M. M., J. L. Willit, J. Prakash, and M. A. Williamson; Method development for quantitative analysis of actinides in molten salts; Journal of the Electrochemical Society; vol. 162, No. 9; 2015; H625-H633.

Yang, Ling, and Robert G. Hudson; Some Investigations of the Ag/AgCl in LiCl—KCl Eutectic Reference Electrode; Journal of the Electrochemical Society; vol. 106, No. 11; 1959; 986-990.

Zhang, Chao, Devin Rappleye, and Michael Simpson; Preliminary Study of Optimization of Normal Pulse Voltammetry for Actinide Measurement in Molten Salt Electrorefiners Using LiCl—KCl—UCl3—MgCl2 as a Surrogate Salt; Journal of the Electrochemical Society; vol. 164, No. 8; 2017; H5218-H5223.

Zhang, Jinsuo et al.; Redox potential control in molten salt systems for corrosion mitigation; Corrosion Science; vol. 144; 2018; 22 pp.

(56) References Cited

OTHER PUBLICATIONS

Zhang, W., C. R. Pulham, A. R. Mount, N. Brockie, and R. Lewin; Thermodynamic calculation and reference electrode calibration for high temperature molten salts; Energy Materials; vol. 3, No. 2; 2008; 132-136.

* cited by examiner

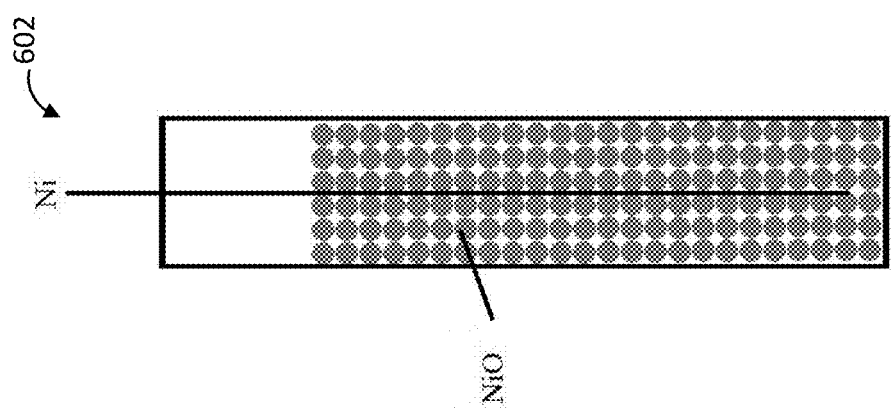
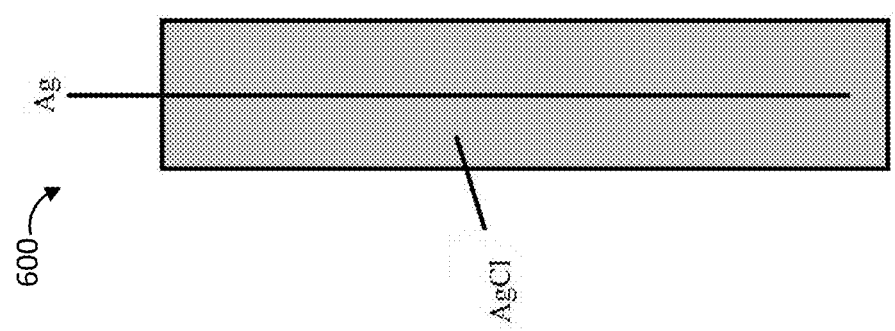
FIG. 6

REFERENCE ELECTRODE AND ELECTROCHEMICAL MONITORING SYSTEM

CROSS-REFERENCE TO RELATED APPLICATION

This application claims the benefit of U.S. provisional application entitled "Reference Electrode and Electrochemical Monitoring System," filed Feb. 21, 2020, and assigned Ser. No. 62/979,843, the entire disclosure of which is hereby expressly incorporated by reference.

STATEMENT REGARDING FEDERALLY SPONSORED RESEARCH OR DEVELOPMENT

This invention was made with government support under Contract No. DE-AC07-051D14517 awarded by the Department of Energy. The government has certain rights in the invention.

BACKGROUND OF THE DISCLOSURE

Field of the Disclosure

The disclosure relates generally to reference electrodes.

Brief Description of Related Technology

Molten salts are used in commercial aluminum smelting, as a coolant in concentrated solar power, and are being developed for use as fuel and/or coolant in advanced nuclear reactor concepts. There are many advantages gained by using molten salts as a heat transfer fluid. The corrosiveness of such molten salts can be inferred by monitoring the open circuit potential (OCP) of the molten salt during operation. This is accomplished by immersing a reference electrode in the molten salt to enable real-time monitoring of the OCP (also referred to as the reduction/oxidation potential, or redox potential) of the molten salt. Speciation and other transient chemical changes in the molten salt can thus be detected to prevent corrosion of reactor components.

Aqueous reference electrodes are often contained in borosilicate glass, but this type of containment is limited by temperature. In high temperature environments a ceramic tube is commonly used to contain the redox couple with either a porous ceramic plug or a thinned wall at the end to allow ion transfer. For instance, a tube composed of mullite may be used to contain the reference electrode. Unfortunately, such ceramic containment may not be sufficient in the nuclear reactor context. Nuclear radiation incident upon the ceramic tube may cause the tube to swell and break, thereby compromising containment.

SUMMARY OF THE DISCLOSURE

In accordance with one aspect of the disclosure, a reference electrode includes a metal body, a lead disposed within the metal body, an insulator disposed between the lead and the metal body, the insulator including a ceramic material, and a porous metal chamber coupled to the metal body, the lead extending into the porous metal chamber. The porous metal chamber is configured to maintain an electrolyte solution within the porous metal chamber to establish a redox couple with the lead.

In accordance with another aspect of the disclosure, an electrochemical monitoring system includes a metal tube, a plurality of leads disposed within the metal tube, an insulator disposed in the metal tube to electrically isolate the plurality of leads from one another and from the metal tube, the insulator having a fragmented structure, the insulator including a ceramic material, and a porous metal chamber coupled to the metal tube. A first lead of the plurality of leads extends into the porous metal chamber. A second lead of the plurality of leads exits the metal tube without entering the porous metal chamber.

In connection with any one of the aforementioned aspects, the reference electrodes and/or electrochemical monitoring systems described herein may alternatively or additionally include or involve any combination of one or more of the following aspects or features. The reference electrode further includes a fitting to secure the metal body to the porous metal chamber. The metal body is welded to the fitting. The insulator has a fragmented structure. A particle size of the fragmented structure of the insulator varies with proximity to the porous metal chamber. The fragmented structure includes particles of a plurality of sizes. The particles are arranged such that the particles having a largest size of the plurality of sizes are closest to the porous metal chamber. The particles of the other sizes of the plurality of sizes are arranged such that the particles become progressively finer as distance from the porous metal chamber increases. The porous metal chamber includes a pair of spaced apart ends and a porous metal wall disposed between the spaced apart ends. The reference electrode further includes a plug disposed in an opening in the porous metal chamber. The plug includes a set screw. The ceramic material includes an oxide ceramic. The ceramic material includes mullite. The metal body includes a metal sheath in which the lead and the insulator are disposed. The metal body includes a metal tube in which the lead and the insulator are disposed. The lead includes silver and the electrolyte solution includes silver chloride. The lead includes a single conductive wire that extends through the metal body and into the porous metal chamber. The electrochemical monitoring system further including an electrolyte solution disposed within the porous metal chamber to establish a redox couple with the first lead. The fragmented structure includes particles of a plurality of sizes. The particles are arranged such that the particles having a largest size of the plurality of sizes are closest to the porous metal chamber. The particles of the other sizes of the plurality of sizes are arranged such that the particles become progressively finer as distance from the porous metal chamber increases. The plurality of leads includes a third lead. The second lead is configured as a working electrode. The third lead is configured as a counter electrode. The electrochemical monitoring system further includes a plug disposed in an opening in the porous metal chamber. The plug includes a set screw. The electrochemical monitoring system further includes a powder disposed within the porous metal chamber. The powder has a chemical composition that establishes a redox couple with the first lead.

BRIEF DESCRIPTION OF THE DRAWING FIGURES

For a more complete understanding of the disclosure, reference should be made to the following detailed description and accompanying drawing figures, in which like reference numerals identify like elements in the figures.

FIG. 6 depicts schematic views of alternative redox couples for use in the reference electrodes of FIGS. 2-4 and otherwise described herein.

Figure 1:
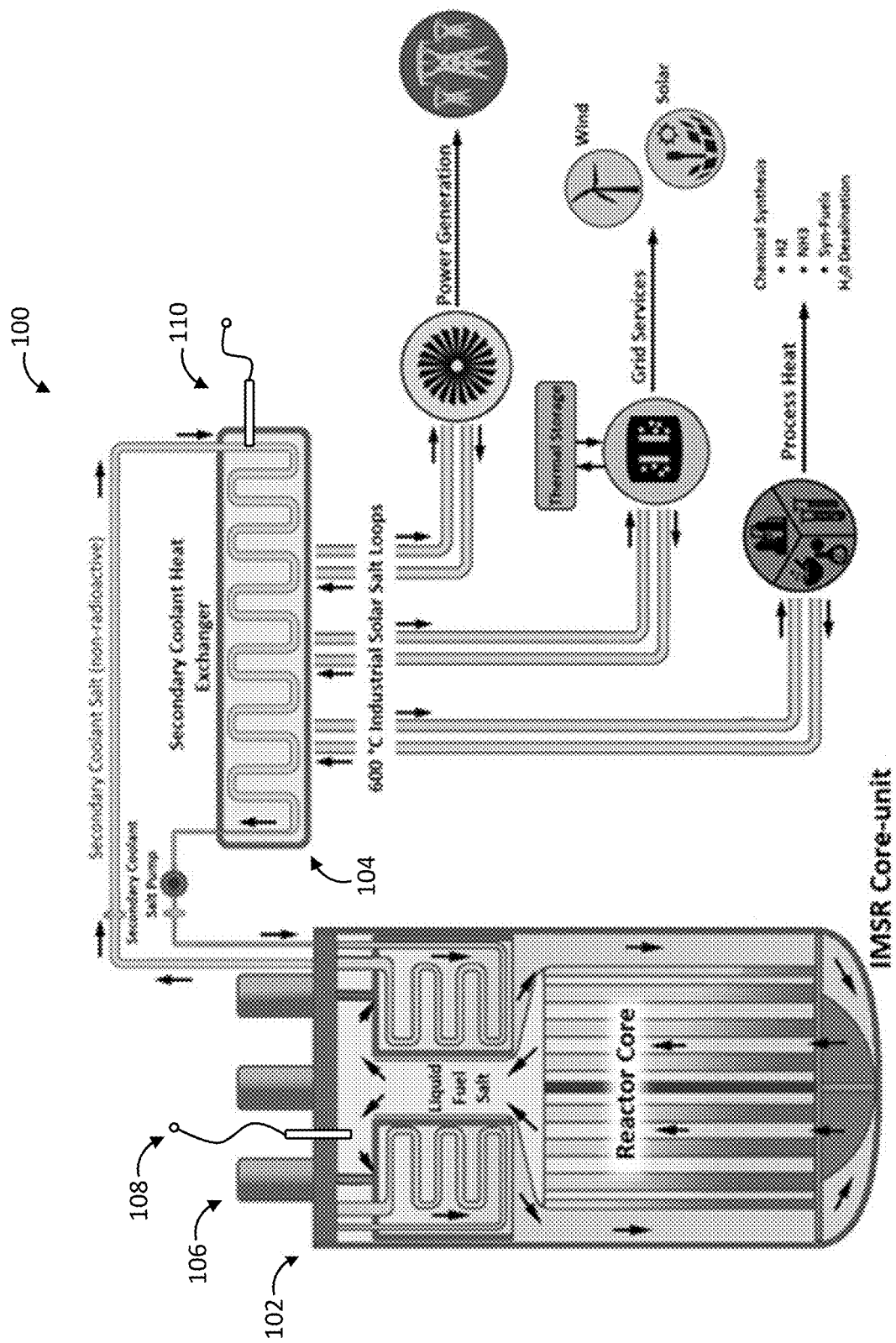
FIG. 1 depicts a schematic diagram of a molten salt reactor having one or more reference electrodes or electrochemical monitoring systems in accordance with one example.

The embodiments of the disclosed reference electrodes and electrochemical monitoring systems may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Reference electrodes with metal containment are described. Electrochemical monitoring systems having such reference electrodes are also described. For example, the reference electrode or electrochemical monitoring system may include a metal tube or sheath for the containment. The metal tube or other metal containment allows the reference electrode to accommodate swelling as a result of irradiation or other operational conditions. In contrast, mullite or other ceramic tubes may swell under irradiation, compromising containment. The metal tube or other metal containment may also allow the reference electrode to be used in high temperature contexts or applications.

In some cases, the metal containment is used to contain fragmented insulation. The fragmented insulation isolates one or more leads of the reference electrode from the metal containment. The metal tube may then be filled with crushed ceramic particles to insulate the lead(s). The insulation may be fragmented by design or as a result of use (due to, e.g., swelling or other breaking). In either case, the metal containment retains the fragments of insulator, thereby maintaining insulation within the reference electrode or electrochemical monitoring system.

The disclosed reference electrodes may include or use a redox couple suitable for use in molten salts, such as silver/silver chloride (Ag/AgCl), or nickel/nickel oxide (Ni/NiO). The redox couple is contained in a porous metal (e.g., sintered metal powder, or sintered multilayer metal mesh) containment, as opposed to ceramic containment. The redox couple may be established by a wire that extends beyond the metal lead tube, or other containment, into the porous metal container filled with the other half of the redox couple. In some cases, one or more additional wires may also extend beyond the metal containment into the main electrolyte to provide electrodes (e.g., working and counter electrodes) to perform electrochemical measurements.

Although described herein in connection with molten salt reactors, the disclosed reference electrodes may be useful in a wide variety of contexts and applications. For instance, the reference electrodes may be used in other environments in which the integrity of a ceramic sheath could be compromised. An example may involve avoiding the use of brittle and/or fragile ceramic components in view of the risk that the ceramic components may be mechanically broken. The environments thus may or may not involve nuclear or other irradiation of the reference electrode.

FIG. 1 depicts a molten salt reactor 100 in accordance with one example. The molten salt reactor 100 includes a reactor core 102 and a heat exchanger 104 that receives a heat transfer fluid from the reactor core 102. The heat transfer fluid is heated within the reactor core 102 (e.g., via a primary heat exchanger) before being pumped or otherwise delivered to the heat exchanger 104. In this example, heat is generated within the reactor core 102 via consumption of a liquid fuel salt. The liquid fuel salt may be provided via one or more fuel salt pumps and/or other ports 106.

In the example of FIG. 1, a secondary coolant salt is used as the heat transfer fluid. The coolant salt may be non-radioactive. The coolant salt may pass through one or more coils in the heat exchanger 104 to transfer the heat to one or more systems before returning to the reactor core 102 for re-heating. The systems may be configured for power generation, thermal storage, or chemical synthesis (e.g., fuel synthesis) or other processing (e.g., desalination), as shown. The nature of the system(s) may vary.

The molten salt reactor 100 includes one or more reference electrodes 108, 110 (or electrochemical monitoring systems in which a reference electrode is integrated) to support the monitoring of the fuel or coolant salts used therein. In this example, the reference electrode 108 is used to monitor the fuel salt within the reactor core 102. The reference electrode 110 is used to support the monitoring of the coolant salt used as a heat transfer fluid. In either case, the reference electrode 108, 110 forms a component or element of a monitoring system configured to monitor the salt. Each monitoring system may be or include an electrochemical monitoring system. The monitoring system is coupled to a container in which molten salt is disposed. The reference electrode 108, 110 is thus in communication with the molten salt being monitored.

The nature of the container in which the salt is disposed may vary. In some cases, the container may be or include a coil or other fluid line, such as a salt loop, through which the salt flows. In other cases, the container may be or include a crucible or other vessel in which the salt is processed.

The configuration, construction, components, and other characteristics of the molten salt reactor 100 may vary from the example shown. For instance, the container and/or other aspects or elements of the molten salt reactor 100 may be configured such that the molten salt reactor is a homogenous reactor or a heterogenous reactor.

In some cases, one or more chloride salts may be used as the fuel salt. Alternatively or additionally, one or more fluoride salts may be used as the fuel salt or the coolant salt. The composition and/or other characteristics of the molten salt may vary. The molten salt may or may not be composed of, or otherwise include, a radioactive material, such as uranium. For instance, the molten salt may be composed of, or otherwise include, a uranium-containing chloride salt and/or fluoride salt. Other chlorides and/or fluorides may be used. In some cases, the salt may be or include a byproduct of reactor operation.

The molten salt being monitored may vary in accordance with the nature of the system. For instance, the molten salt may be or include one or more nitrate salts in non-reactor contexts or applications, such as concentrated solar power systems.

Figure 2:
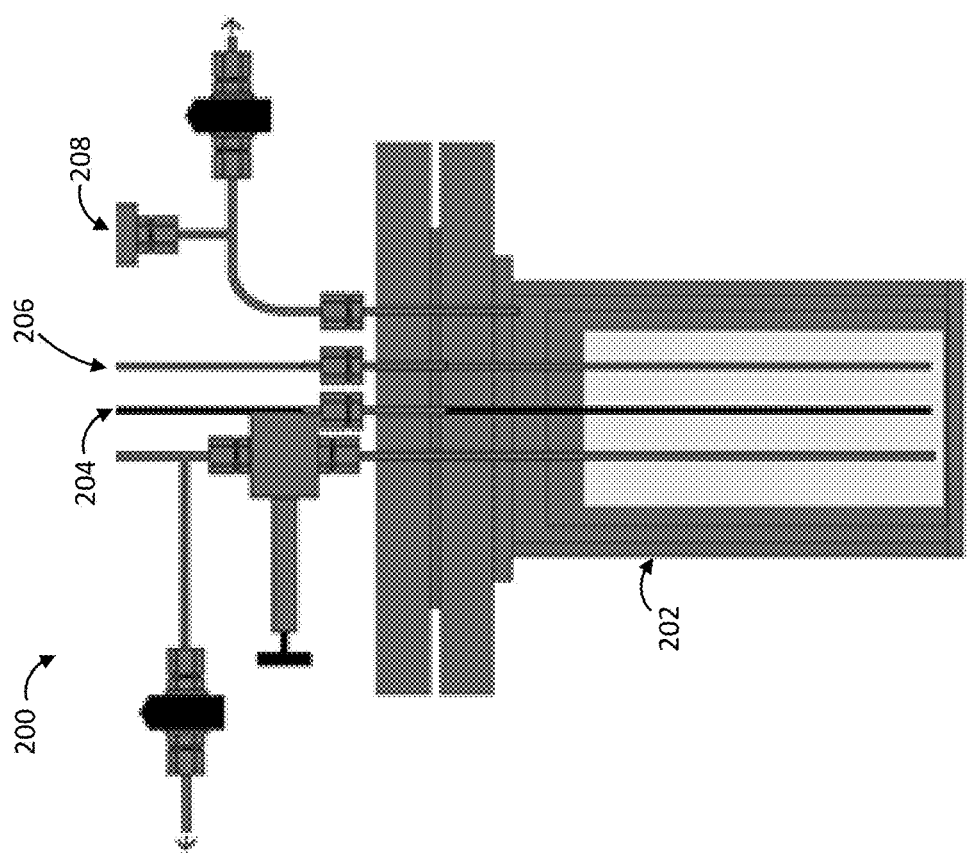
FIG. 2 is an elevational, schematic view of a monitoring system having a reference electrode in accordance with one example.

FIG. 2 depicts a monitoring system 200 in accordance with one example. The system 200 is directed to monitoring a fuel, coolant, or other salt disposed within a container 202, such as a crucible. In this case, the monitoring system 200 includes a reference electrode 204 to support one or more electrochemical measurements.

The electrochemical measurements utilize an anode (or working electrode) and a cathode (or counter electrode), which may or may not be provided in a common housing with the reference electrode 204. The extent to which the working, counter, and reference electrodes are provided in an integrated manner may vary. The working and/or counter electrodes may be provided by another component of the monitoring system 200. For instance, in some cases, the container 202 may be used as a counter electrode. However, use of dedicated components for the working and/or counter electrodes may be useful in connection with performing certain types of electrochemical measurements, such as cyclic voltammetry and chronoamperometry, without affecting other components of the monitoring system 200. An example of an integrated monitoring system with dedicated working and counter electrodes is described below in connection with FIG. 5.

The monitoring system 200 may include a number of other sensors or detectors for other types of measurements, including, for instance, a thermocouple 206 for temperature measurements, and a pressure transducer 208 for pressure measurements. In some cases, the sheath, or metal exterior, of the thermocouple 206 may be used as the anode (or working electrode) or the cathode (or counter electrode) in the electrochemical measurements. Alternatively, one or more additional electrodes are included. Additional and/or alternative instruments may be included. For instance, the monitoring system 200 may include any number of electrodes (e.g., working or counter electrodes) to support and/or implement the electrochemical or other measurements.

The reference electrode 204 and other electrodes and instruments are in communication with the molten salt disposed in the container 202. Further details regarding the reference electrode 204, both with and without the integration of counter and working electrodes, are provided below in connection with the examples of FIGS. 3-5.

The monitoring system 200 may include additional, fewer, or alternative components. For instance, the monitoring system 200 may or may not include a number of optional ports for supplying an inert gas (e.g., argon) or sampling or otherwise removing the salt. The monitoring system 200 may include a potentiostat, voltmeter, or other voltage measurement circuit for, e.g., monitoring the redox potential. In this manner, the voltages at the anode and cathode may be measured relative to the reference electrode 204. For example, the voltmeter may be connected between the component acting as the anode (or other working electrode) and the reference electrode 204. The potentiostat, voltmeter or another voltage measurement circuit may also be connected between the thermocouple 206 (or other component acting as the cathode, or working electrode) and the reference electrode 204. In some cases, the voltage measurement circuit may be connected to another conductive element (e.g., any conductive element in contact with the molten salt, including, e.g., a sampling tube, a fuel rod, etc.) acting as the counter electrode, such as the container 202.

Figure 3:
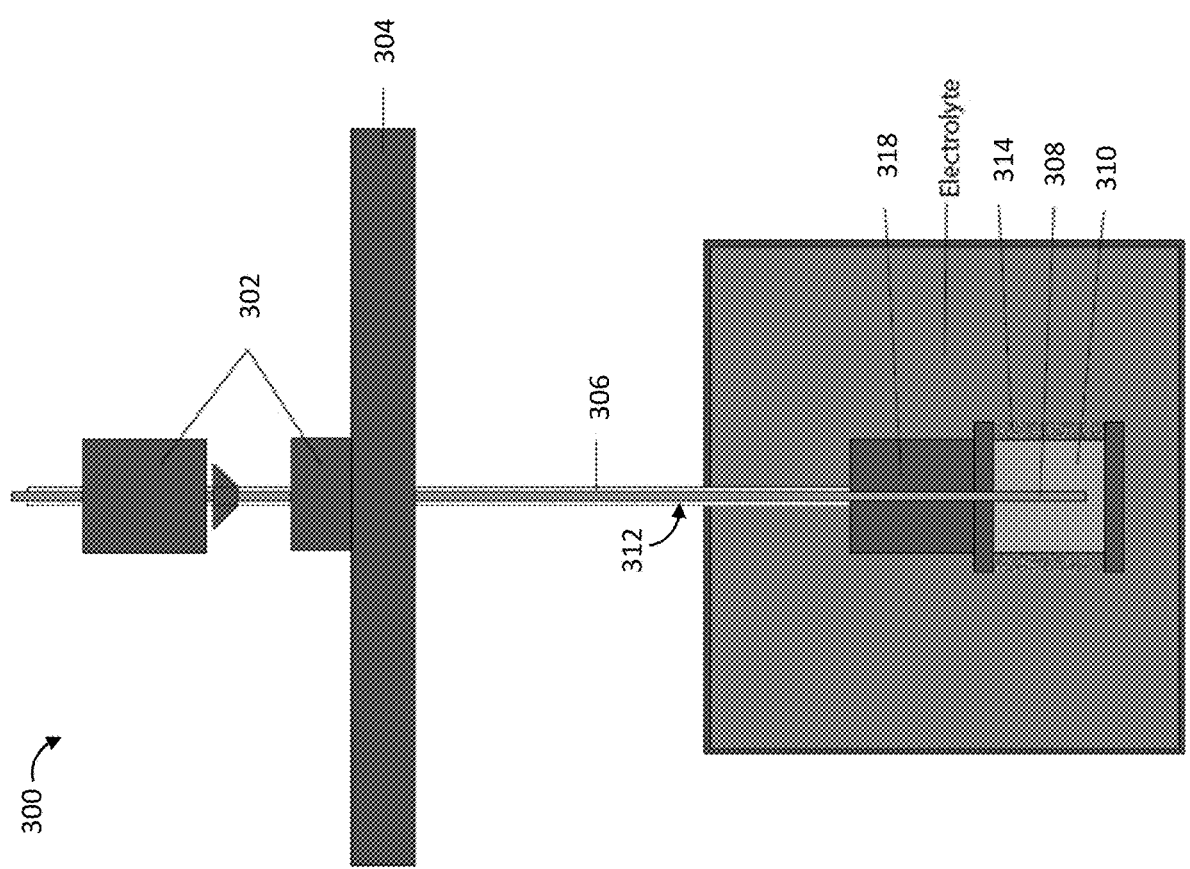
FIG. 3 depicts an elevational, schematic view of a reference electrode having a metal body and a fragmented insulator in accordance with one example.

FIG. 3 depicts a reference electrode 300 in accordance with one example. In use, the reference electrode 300 may be in communication with a molten salt in a molten salt reactor, such as the molten salt reactors described above, or in another molten salt context. In other cases, the reference electrode 300 may be used in conjunction with substances other than molten salt.

The reference electrode 300 is shown in FIG. 3 without the container in which the molten salt is disposed for ease in depiction. In this example, the reference electrode 300 includes a compression fitting 302 to engage a lid 304 or other component of the container. This fitting 302 allows the system to be sealed from undesired atmosphere (such as ambient atmosphere, or atmosphere from other processes). Use of such a compression fitting is not typically feasible with ceramic containment tubes.

The reference electrode 300 includes a metal body 306. The metal body 306 may be elongated. In this example, the metal body 306 is configured as, or includes, a metal sheath or tube. Alternative or additional body shapes may be used, including, for instance, a planar body. The metal body 306 may be used for containment as described herein.

The reference electrode 300 includes a lead 308 disposed within the metal body 306. The lead 308 extends through the metal body 306. The lead 308 extends beyond the metal body 306 at one end to establish a redox couple of the reference electrode 300, and at the opposite end to establish an electrical connection for the reference electrode 300. In this example, the lead 308 is configured as, or includes, a single conductive wire that extends through and beyond the metal body 306. Other configurations may be used. For example, the lead 308 may be a composite structure.

In some cases, the lead 308 is composed of, or includes, silver, such that an electrolyte solution 310 of the reference electrode 300 includes silver chloride. Other redox couples may be used, examples of which are described below in connection with FIG. 6. The composition of the lead and the electrolyte solution (or other electrolyte or redox couple component) may vary accordingly.

The reference electrode 300 also includes an insulator 312 disposed between the lead 308 and the metal body 306. As shown in FIG. 3, the lead 308 and the insulator 312 are disposed in the metal sheath or tube of the metal body 306. As described herein, the insulator 312 may have a fragmented structure. The insulator 312 may be composed of, or otherwise include, a ceramic material. In the example of FIG. 3, the insulator 312 is provided by crushed ceramic particles. The manner in which, and/or extent to which, the structure of the insulator 312 is fragmented may vary.

The insulator 312 may or may not be fragmented. For instance, the insulator 312 may instead include one or more solid tubes or sheaths. Alternatively, the insulator 312 may include a solid structure having one or more bores in which the lead(s) 308 are disposed. Such insulator structures may nonetheless swell or otherwise break during use, i.e., become fragmented. In that event, the metal tube or other containment maintains the insulation or other material of the insulator 312.

In some cases, an oxide ceramic may be used as, or incorporated into, the ceramic material. For example, the ceramic material may include alumina or magnesia. Alternatively or additionally, the ceramic material includes mullite and/or other silicate materials.

The reference electrode 300 further includes a porous metal chamber 314 into which the lead 308 extends. The porous metal chamber 314 is configured to maintain the electrolyte solution 310 within the porous metal chamber 314 to establish the redox couple with the lead 308. In operation, the electrolyte 310 and the porous metal chamber 314 may be immersed in a further (e.g., bulk) electrolyte solution, as shown in FIG. 3. The reference electrode 300 is used to measure the potential of a working electrode disposed in the bulk electrolyte solution relative to the reference electrode 300. The open circuit potential of the working electrode versus the reference electrode 300 may be considered the redox potential of the bulk electrolyte.

The manner in which the metal chamber 314 is porous may vary. For example, the metal chamber 314 may be porous in the sense that small pores extend from the inner side of the tube to the outer side of the tube in an otherwise solid tube. Various commercially available products may be used, including, for example, the porous metal cups and other assembles available from Mott Corporation (mottcorp-.com/products/sintered-porous-metal-cups-discs-tubes-sheet-and-other-assemblies). Other types of porous metal chambers may be used. For example, the metal chamber 314 may be composed of, or otherwise include, a multilayer composite of a sintered metal mesh or cloth. The porous metal chamber 314 may be composed of, or otherwise include, stainless steel, super alloys (e.g., alloys available from Inconel, Hastelloy, Haynes, etc.), or one or more noble metals, such as platinum.

The porous metal chamber 314 is coupled to the metal body 306. For example, the reference electrode 300 may have the metal body 306 welded to the porous metal chamber 314. Alternatively, as in the example of FIG. 3, a natural pipe thread (NPT) fitting 318 is included, but other types of fittings may be used.

The metal body 306 may be welded or otherwise secured to the fitting 318.

In the example of FIG. 3, the porous metal chamber 314 includes a pair of spaced apart ends and one or more porous metal sidewalls disposed between the spaced apart ends. The ends may be configured as a cap and a plug.

The shape, construction, and other characteristics of the porous metal chamber 314 may vary. For instance, the porous metal chamber 314 may include a uniform exterior surface, such as a porous metal tube. In such cases, a fastener, such as a threaded bolt, may be fixedly secured to the porous metal tube for engagement with the fitting. The fastener may define an interior through which the lead can extend to reach into the chamber.

Figure 4:
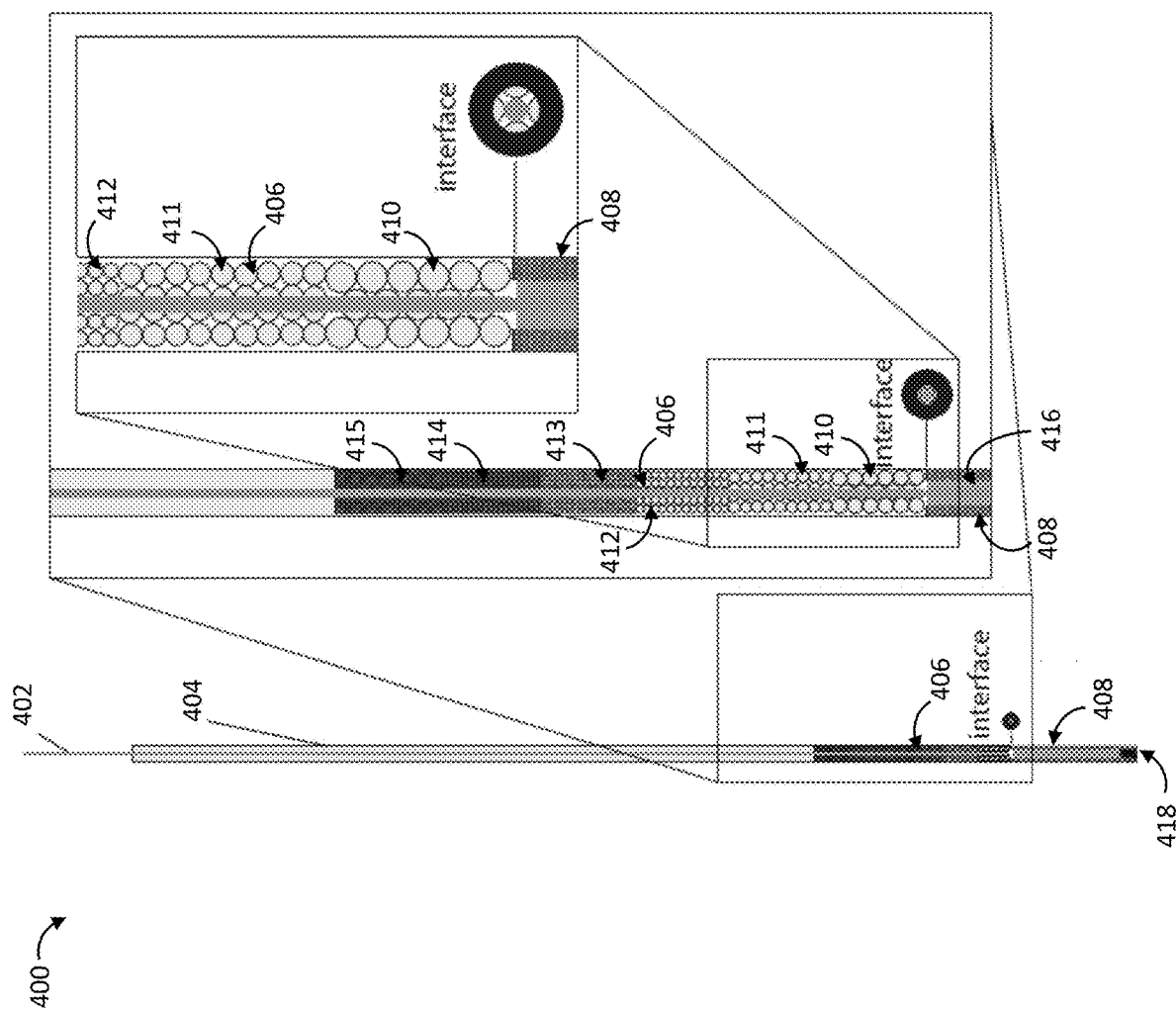
FIG. 4 depicts an elevational, schematic view of a reference electrode to depict in greater detail a metal body and a fragmented insulator thereof in accordance with one example.

FIG. 4 depicts a reference electrode 400 in accordance with one example. FIG. 4 depicts in greater detail the manner in which a lead 402 of the reference electrode 400 is electrically isolated in accordance with one example. The wire or other lead 402 is electrically isolated from a metal tube or other body 404 by fragmented insulation, as described herein.

In the example of FIG. 4, the metal body 404 is loaded with ceramic particles of varying sizes to provide an insulator 406 or other insulation. The particle size of the fragmented structure of the insulator varies with proximity to a porous metal chamber 408. As shown in FIG. 4, coarse ceramic particles 410 are provided near the bottom of the metal body 404 (e.g., where the metal body 404 is secured to a fitting (e.g., the fitting 318 of FIG. 3) or the porous metal chamber 408. The ceramic particles become finer as the distance from the fitting or chamber increases, as shown. In this example, particles 411-415 of smaller or finer size are shown for ease in illustration.

The fragmented structure of the insulator 406 may include particles of any number of sizes. The particles 410-415 are arranged such that the particles having the largest size are closest to the porous metal chamber 408. The particles of the other sizes of the plurality of sizes are arranged such that the particles become progressively finer as distance from the porous metal chamber 408 increases. In the example of FIG. 4, six different particle sizes are used.

Additional, fewer, or alternative sizes may be used. For instance, the number of different sizes may vary in accordance with the sizes of the metal body 404 and the lead 402. In the example of FIG. 4, the lead 402 is provided by a wire (e.g., an Ag wire) having a diameter of 0.0394 inches (1 mm), while the metal body 404 is a tube having an outer diameter of 0.25 inches. Other particle sizes may be used to accommodate other diameters.

The length and other dimensions of the metal body 404 and the lead 402 may also vary. In one example, the metal body 404 is a tube having a length 14 inches, but other lengths may be used. The wire of the lead 402 may extend outward beyond the tube 404 by about one inch (to reach into chamber), but other lengths may be used.

FIG. 4 also shows the other half of the redox couple provided for the reference electrode 400. An electrolyte solution 416 is disposed within the porous metal chamber 408 as shown. The electrolyte solution may include AgCl (for silver electrodes), NiO (for nickel electrodes) or other electrolyte solutions.

The porous metal chamber 408 may include an opening to allow the electrolyte to be added. In the example of FIG. 4, the porous metal chamber 408 includes a bottom opening. A plug 418 is included to close the opening during use. In this case, the plug 418 is or includes a set screw. The opening in the porous metal chamber 408 may thus be configured for threaded engagement by the set screw.

Figure 5:
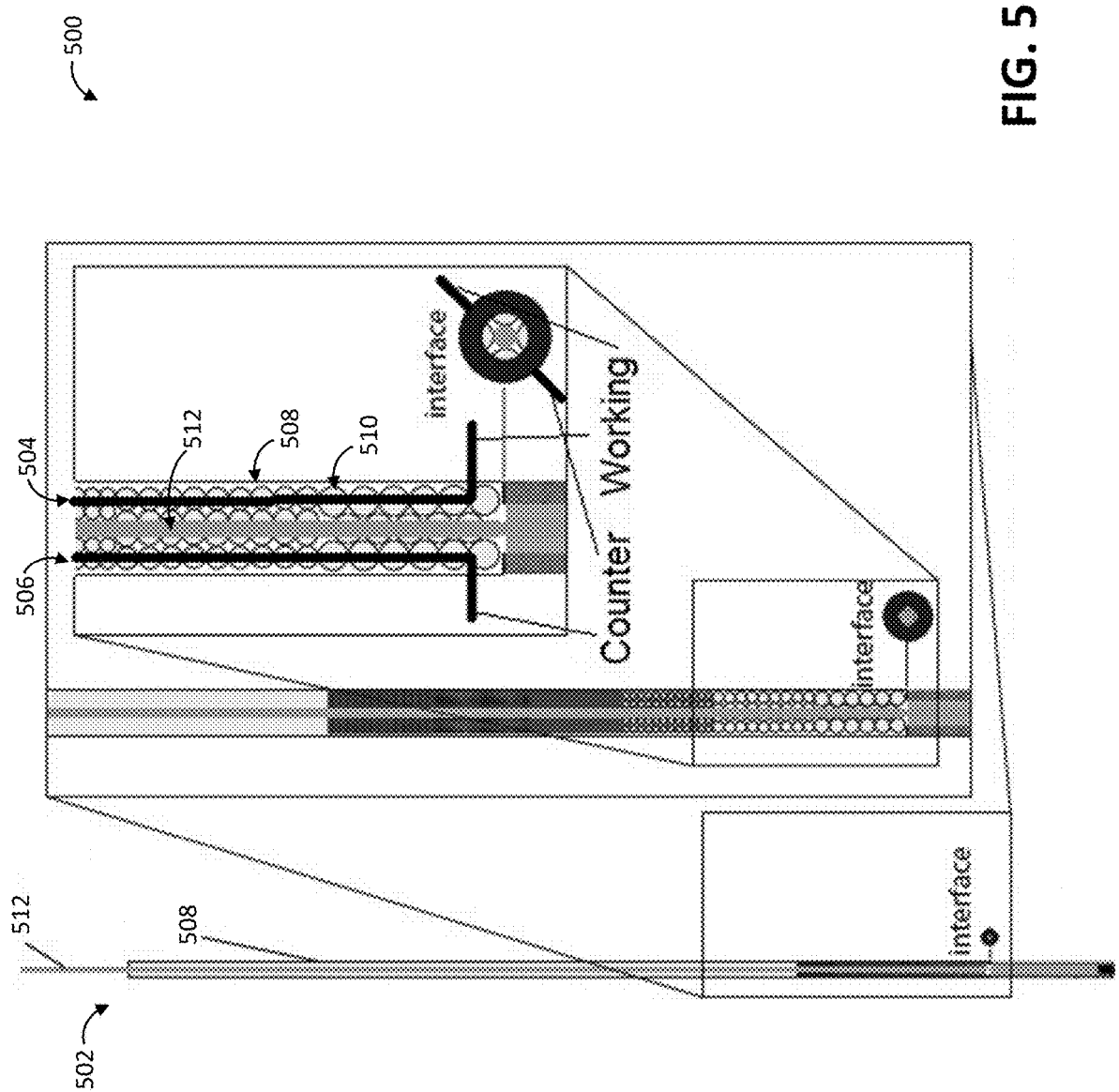
FIG. 5 depicts an elevational, schematic view of an electrochemical monitoring system in accordance with another example.

FIG. 5 depicts an electrochemical monitoring system 500 in accordance with one example. The electrochemical monitoring system 500 may include a reference electrode 502 as described above (e.g., FIG. 4). The electrochemical monitoring system 500 may differ from the above-described examples in that one or more additional electrodes are included. In the example of FIG. 5, two additional leads 504, 506 are included to provide both working and counter electrodes. All three leads are disposed within a metal tube 508 as shown. An insulator 510 electrically isolates the leads from one another and from the metal tube 508. A lead 512 for the reference electrode 502 extends into a porous metal chamber, as described herein, while the other lead(s) 504, 506 exit the metal tube 508 without entering the porous metal chamber (e.g., at positions spaced from the interface between the metal tube and the porous metal chamber). One or more ports or other holes in the metal tube may be provided to accommodate the other leads.

The leads 504, 506, 512 may be similarly or differently configured. In some cases, different material compositions are used. For instance, the leads 504, 506 for the working and counter electrodes may be composed of, or otherwise include, tungsten.

Fewer, additional, or alternative leads may be included in the electrochemical monitoring system. For instance, only a working electrode may be provided in some cases in which the counter electrode is provided by a crucible or other container in which the electrochemical monitoring system is disposed during use.

The form factor or shape of the reference electrodes and electrochemical monitoring systems may vary from the examples described above. For instance, the reference electrodes may or may not be rod-shaped. For example, one or more features, components, or aspects of the reference electrodes may be planar.

Described above are reference electrodes that utilize a robust container to house the redox couple and lead used to sense potential. To sense potential, the redox couple serves as a reference point. The lead transmits the signal to a measuring device. A permeable membrane, which contains the redox couple, allows the redox couple to communicate with the salt (e.g., via ion exchange). As described above, the robust reference electrode provides a porous metal (e.g., sintered mesh) as the membrane rather than a permeable ceramic.

FIG. 6 depicts examples of several alternative redox couples for use in the reference electrodes described herein. The composition of the redox couple inside the porous tube may vary. The redox couple includes an oxidized and reduced phase in contact that can change back and forth in response to potential changes. As shown in FIG. 6, one example has a redox couple 600 of Ag/AgCl, and another example is a redox couple 602 of Ni/NiO. However, other redox couples may be used, including, for instance, other examples involving a metal rod (e.g., Ni, Be or Fe) and its oxidized species (oxide, chloride, or fluoride). The metal rod of the redox couple may be composed of, or otherwise include, any metal that does not corrode, such as tungsten. In operation, to use the Ag/AgCl redox couple 600 as an example, if the salt becomes more oxidizing then some of the Ag converts to AgCl. If the salt becomes more reducing, then some of the AgCl converts to Ag. The potential at which these conversions occur is fixed, which enables its use as a reference point. The same goes for any reduced/oxidized couple.

The Ni/NiO redox couple 602 provides an example in which the redox couple includes a solid rather than a liquid electrolyte. The solid may be in the form of a powder. In this example, the oxidized phase, NiO, is in powder form inside the porous tube. As shown in FIG. 6, the NiO powder is in contact with the lead to establish the redox couple 602. In this case, the lead is composed of, or otherwise includes, Ni. The powder thus has a chemical composition that establishes a redox couple with the lead. Reliance on a powder rather than a liquid may be useful because the powder is not diluted in the event of liquid inadvertently leaking into the tube.

A wide variety of other redox couples may be used with the reference electrodes described herein. For instance, various oxides, chlorides, and fluorides may be used for the oxidized species of the redox couple. Oxides may be useful in connection with applications involving pyroprocessing. Fluorides and chlorides may be useful in connection with applications involving molten salt reactors or concentrated solar power.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A reference electrode comprising:
a metal body;
a lead disposed within the metal body;
an insulator disposed between the lead and the metal body, the insulator comprising a ceramic material; and
a porous metal chamber coupled to the metal body, the lead extending into the porous metal chamber;
wherein the porous metal chamber is configured to maintain an electrolyte solution within the porous metal chamber to establish a redox couple with the lead.

2. A reference electrode comprising:
a metal body;
a lead disposed within the metal body;
an insulator disposed between the lead and the metal body, the insulator comprising a ceramic material;
a porous metal chamber coupled to the metal body, the lead extending into the porous metal chamber; and
a fitting to secure the metal body to the porous metal chamber, wherein the metal body is welded to the fitting;
wherein the porous metal chamber is configured to maintain an electrolyte solution within the porous metal chamber to establish a redox couple with the lead.

3. The reference electrode of claim 1, wherein the insulator has a fragmented structure.

4. A reference electrode comprising:
a metal body;
a lead disposed within the metal body;
an insulator disposed between the lead and the metal body, the insulator comprising a ceramic material; and
a porous metal chamber coupled to the metal body, the lead extending into the porous metal chamber;
wherein:
the porous metal chamber is configured to maintain an electrolyte solution within the porous metal chamber to establish a redox couple with the lead;
the insulator has a fragmented structure; and
a particle size of the fragmented structure of the insulator varies with proximity to the porous metal chamber.

5. A reference electrode comprising:
a metal body;
a lead disposed within the metal body;
an insulator disposed between the lead and the metal body, the insulator comprising a ceramic material; and
a porous metal chamber coupled to the metal body, the lead extending into the porous metal chamber;
wherein:
the porous metal chamber is configured to maintain an electrolyte solution within the porous metal chamber to establish a redox couple with the lead;
the insulator has a fragmented structure;
the fragmented structure comprises particles of a plurality of sizes;
the particles are arranged such that the particles having a largest size of the plurality of sizes are closest to the porous metal chamber; and
the particles of the other sizes of the plurality of sizes are arranged such that the particles become progressively finer as distance from the porous metal chamber increases.

6. The reference electrode of claim 1, wherein the porous metal chamber comprises a pair of spaced apart ends and a porous metal wall disposed between the spaced apart ends.

7. The reference electrode of claim 1, further comprising a plug disposed in an opening in the porous metal chamber.

8. The reference electrode of claim 7, wherein the plug comprises a set screw.

9. The reference electrode of claim 1, wherein the ceramic material comprises an oxide ceramic.

10. The reference electrode of claim 1, wherein the ceramic material comprises mullite.

11. The reference electrode of claim 1, wherein the metal body comprises a metal sheath in which the lead and the insulator are disposed.

12. The reference electrode of claim 1, wherein the metal body comprises a metal tube in which the lead and the insulator are disposed.

13. A reference electrode comprising:
a metal body;
a lead disposed within the metal body;
an insulator disposed between the lead and the metal body, the insulator comprising a ceramic material; and
a porous metal chamber coupled to the metal body, the lead extending into the porous metal chamber;
wherein:
the porous metal chamber is configured to maintain an electrolyte solution within the porous metal chamber to establish a redox couple with the lead; and
the lead comprises silver and the electrolyte solution comprises silver chloride.

14. The reference electrode of claim 1, wherein the lead comprises a single conductive wire that extends through the metal body and into the porous metal chamber.

15. An electrochemical monitoring system comprising:
a metal tube;
a plurality of leads disposed within the metal tube;
an insulator disposed in the metal tube to electrically isolate the plurality of leads from one another and from the metal tube, the insulator comprising a ceramic material; and
a porous metal chamber coupled to the metal tube;
wherein a first lead of the plurality of leads extends into the porous metal chamber, and
wherein a second lead of the plurality of leads exits the metal tube without entering the porous metal chamber.

16. The electrochemical monitoring system of claim 15, further comprising an electrolyte solution disposed within the porous metal chamber to establish a redox couple with the first lead.

17. The electrochemical monitoring system of claim 15, wherein the insulator has a fragmented structure.

18. The electrochemical monitoring system of claim 17, wherein:
the fragmented structure comprises particles of a plurality of sizes;
the particles are arranged such that the particles having a largest size of the plurality of sizes are closest to the porous metal chamber; and
the particles of the other sizes of the plurality of sizes are arranged such that the particles become progressively finer as distance from the porous metal chamber increases.

19. The electrochemical monitoring system of claim 15, wherein:
the plurality of leads comprises a third lead;
the second lead is configured as a working electrode; and
the third lead is configured as a counter electrode.

20. The electrochemical monitoring system of claim 15, further comprising a plug disposed in an opening in the porous metal chamber, wherein the plug comprises a set screw.

21. The electrochemical monitoring system of claim 15, further comprising a powder disposed within the porous metal chamber, wherein the powder has a chemical composition that establishes a redox couple with the first lead.

* * * * *